United States Patent
Ryba et al.

(10) Patent No.: US 10,476,414 B2
(45) Date of Patent: Nov. 12, 2019

(54) METHOD OF CONTROLLING ELECTRIC MOTORS, CORRESPONDING DEVICE AND MOTOR

(71) Applicants: STMicroelectronics Design and Application S.R.O., Prague (CZ); STMicroelectronics S.r.l., Agrate Brianza (IT)

(72) Inventors: Jiri Ryba, Prague (CZ); Gianluigi Forte, Camporotondo Etneo (IT); Andrea Spampinato, Gravina di Catania (IT)

(73) Assignees: STMicroelectronics Design and Application S.R.O., Prague (CZ); STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 15/377,911

(22) Filed: Dec. 13, 2016

(65) Prior Publication Data
US 2017/0373619 A1    Dec. 28, 2017

(30) Foreign Application Priority Data
Jun. 28, 2016   (EP) .................................. 16425066

(51) Int. Cl.
H02P 6/18    (2016.01)
H02P 25/03   (2016.01)

(52) U.S. Cl.
CPC .............. *H02P 6/183* (2013.01); *H02P 6/18* (2013.01)

(58) Field of Classification Search
CPC .............................. H02P 6/183; H02P 25/03

USPC ....................... 318/400.02, 400.03
See application file for complete search history.

(56) References Cited

U.S. PATENT DOCUMENTS

| 6,069,467 A * | 5/2000 | Jansen ............... H02P 6/183 |
| | | 318/801 |
| 8,502,488 B2 | 8/2013 | Williams et al. |
| 9,325,263 B1 | 4/2016 | Costanzo et al. |

(Continued)

FOREIGN PATENT DOCUMENTS

| EP | 0420501 A1 | 4/1991 |
| EP | 2924870 A1 | 9/2015 |

(Continued)

OTHER PUBLICATIONS

EPO Search Report and Written Opinion for EP 16425066.4 dated Jan. 3, 2017 (8 pages).

(Continued)

*Primary Examiner* — Kawing Chan
*Assistant Examiner* — Cortez M Cook
(74) *Attorney, Agent, or Firm* — Crowe & Dunlevy

(57) ABSTRACT

A driving circuit for an electric motor including multiple windings includes a sensing circuit to sense motor winding currents. A motor rotation angle signal is generated from the sensed currents and motor control voltages are generated as a function of the motor rotation angle signal. The motor windings are driven with motor drive voltages obtained by injecting into the motor control voltages injection pulses. The sensed currents include both torque components and injection components. The motor rotation angle signal is generated as a function of the injection components of the sensed currents.

25 Claims, 5 Drawing Sheets

(56) References Cited

U.S. PATENT DOCUMENTS

| | | | | |
|---|---|---|---|---|
| 2004/0066205 | A1* | 4/2004 | Imai | G01R 31/34 |
| | | | | 324/709 |
| 2009/0167224 | A1* | 7/2009 | Miura | B62D 5/046 |
| | | | | 318/400.23 |
| 2013/0057184 | A1* | 3/2013 | Kim | H02P 6/183 |
| | | | | 318/400.02 |
| 2014/0015458 | A1* | 1/2014 | Lin | H02P 6/188 |
| | | | | 318/400.03 |
| 2014/0225548 | A1* | 8/2014 | Xu | H02P 6/183 |
| | | | | 318/400.33 |
| 2014/0346984 | A1* | 11/2014 | Shiota | H02P 6/183 |
| | | | | 318/400.02 |
| 2015/0381087 | A1 | 12/2015 | Han et al. | |

FOREIGN PATENT DOCUMENTS

| | | |
|---|---|---|
| JP | 2009183061 A | 8/2009 |
| WO | WO-2009136381 A2 | 11/2009 |

OTHER PUBLICATIONS

Yue Zhao, Zhe Zhang, Cong Ma, Wei Qiao and Liyan Qu, Sensorless Control of Surface-Mounted Permanent-Magnet Synchronous Machines for Low-Speed Operation Based on High-Frequency Square-Wave Voltage Injection, Published in: Industry Applications Society Annual Meeting, 2013 IEEE Date of Conference: Oct. 6-11, 2013 pp. 1-8 ISSN : 0197-2618.

M. Corley and R. Lorenz, "Rotor position and velocity estimation for a salient-pole permanent magnet synchronous machine at standstill and high speeds", iEEE Trans. Ind. Appl., vol. 34, No. 4, pp. 784-789, Jul./Aug. 1998.

Roman Filka, Peter Balazovic "Sensorless Control of IPMSM Seamlessly Covering Entire Speed Range without Rotor Position Sensor", PCIM 2006 Operation Based on High-Frequency Square-Wave Voltage Injection, 2013-IA CC-321.

Yoshitaka Iwaji, Ryoichi Takahata, Takahiro Suzuki, Shigehisa Aoyagi "Position sensorless control method at zero speed region for permanent magnet synchronous motors using the neutral point voltage of stator windings" 2014 IEEE Energy Conversion Congress and Exposition (ECCE).

* cited by examiner $\theta = \frac{1}{2}\pi$ $\theta = \frac{3}{4}\pi$ $\theta = \frac{1}{4}\pi$ $\theta = \pi$ $\theta = \frac{1}{2}\pi$ $\theta = \frac{3}{4}\pi$ $\theta = \frac{1}{4}\pi$ $\theta = \pi$

METHOD OF CONTROLLING ELECTRIC
MOTORS, CORRESPONDING DEVICE AND
MOTOR

PRIORITY CLAIM

This application claims priority from European Application for Patent No. 16425066.4 filed Jun. 28, 2016, the disclosure of which is incorporated by reference.

TECHNICAL FIELD

The description relates to electric motor control. One or more embodiments may apply for example to "zero-speed" control of permanent magnet synchronous motors.

BACKGROUND

A variety of products may involve three phase motor control applications, for example for position control and/or low speed applications.

Home appliances such as washing machines, dryers, refrigerators, industrial and home automation, the automotive sector and medical devices may be exemplary of such products.

Sensorless motor control is increasingly becoming a standard solution for applications where cost reduction and increased robustness ("sturdiness") may represent significant factors.

Control at zero or very low speed ("zero-speed control") may represent a technical issue in sensorless motor control, for example in providing position control, speed reversal, maximum torque at the startup, full torque at zero speed.

Certain implementations may address this issue for example by exploiting:
   motor anisotropy in direct and quadrature axis,
   resistance/inductance variation due iron saturation effects,
   mechanical motor asymmetry in the iron, or
   permanent magnet asymmetry.

While effective, these and other methods may be limited by factors such as:
   having to rely on specific motor type (salience), construction (iron or magnet asymmetry, neutral point availability), or other effects (iron saturation);
   the need of having salience on rotor with difference between direct and indirect axes, or a stator winding in star connection with an accessible neutral point;
   cost of position sensors; and
   limited speed range and limited applicability to different motor types.

There is a need in the art to overcome the critical issues mentioned in the foregoing.

SUMMARY

One or more embodiments may be applied in driving Permanent Magnet Synchronous Motors (PMSM's), where functionality is expected also at zero or very low speed.

One or more embodiments may be applied in driving both Interior Permanent Magnet Synchronous Motors (IPMSMs) and Surface Permanent Magnet Synchronous Motors (SPMSMs).

One or more embodiments may be applied for example in the automotive or industrial field.

One or more embodiments may provide the benefit of saving costs due to the possibility of avoiding position sensors.

In one or more embodiments, an injected voltage may be simply one sine-wave pulse or square shape of pulse.

In one or more embodiments, a pulse of opposite polarity may be injected to compensate offset.

One or more embodiments may rely on the response current being influenced by the rotor electrical position, so that the peak amplitude or mean value may be used to reconstruct the rotor electrical angle.

In one or more embodiments, a same process can be applied to measuring two different phase currents and reconstructing the electrical angle.

One or more embodiments may operate satisfactorily at zero and low speed.

One or more embodiments may not depend on the motor magnetic anisotropy (so that both IPMSM and SPMSM can be used).

BRIEF DESCRIPTION OF THE FIGURES

One or more embodiments will now be described, purely by way of example, with reference to the annexed figures, in which.

DETAILED DESCRIPTION

In the ensuing description, one or more specific details are illustrated, aimed at providing an in-depth understanding of examples of embodiments of the present description. The embodiments may be obtained without one or more of the specific details, or with other methods, components, materials, etc. In other cases, known structures, materials, or operations are not illustrated or described in detail so that certain aspects of embodiments will not be obscured.

The claims are an integral part of the technical disclosure of one or more embodiments has provided herein.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

Figure 1:
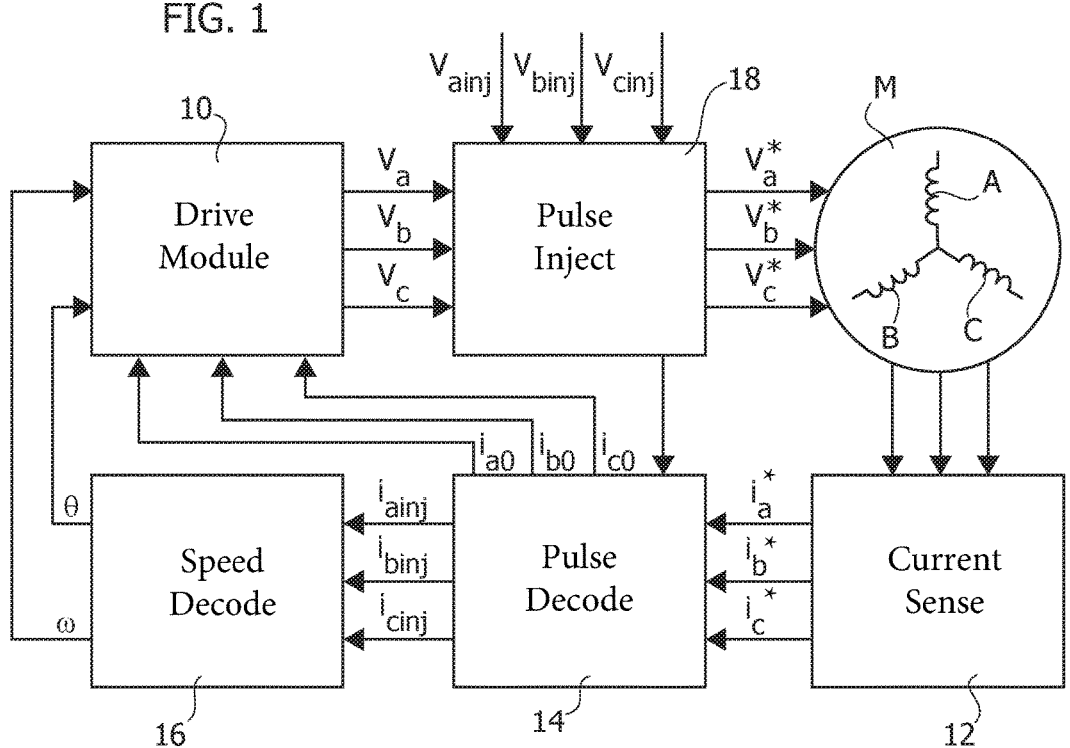
FIG. 1 is an exemplary block diagram of a motor control arrangement.

FIG. 1 is an exemplary block diagram of a system for controlling an electric motor M, which per se may be a separate item from the embodiments.

For instance, the motor M may be a Permanent Magnet Synchronous Motor (PMSM).

For instance, the motor M may be either of a IPMSM (Interior Permanent Magnet Synchronous Motors) or a SPMSM (Surface Permanent Magnet Synchronous Motor).

In the diagram of FIG. 1, the block 10 is exemplary of, for example, a PMSM driving module configured to drive the motor M.

Various motor control procedures are known in the art which may be applied for that purpose: a so-called field oriented control (FOC), a sinusoidal control as well as a step commutation control may be exemplary of these.

Operation of such an arrangement may be based for example on any of, for example, a current, voltage, speed, torque loop or the like.

For instance, entities involved in such a control may include:
- the three currents $i_{a0}$, $i_{b0}$, $i_{c0}$ intended to flow into the windings A, B, C of the motor M to provide the required torque;
- the electrical angle $\theta$ of the rotor of the motor M,
- the electrical angular velocity (speed) $\omega$.

A current sensing module 12 may sense the currents in the motor windings A, B, C and provide corresponding values $i_a{}^*$, $i_b{}^*$, $i_c{}^*$ to a pulse decoding module 14.

In turn the pulse decoding module 14 may provide the three current values $i_{a0}$, $i_{b0}$, $i_{c0}$ to the PMSM drive module.

The electrical angle $\theta$ and velocity $\omega$ may be provided to the module 10 by an angle and speed decoding module 16 fed by the pulse decoding module 14 with injected values $i_{ainj}$, $i_{binj}$, $i_{cinj}$.

The control procedure implemented in the drive module may provide output control voltage values $V_a, V_b, V_c$ to be applied to the motor phases.

The representation in FIG. 1 is otherwise purely exemplary.

For instance, one or more of the parameters discussed may not be mandatory. The electrical angle $\theta$ may facilitate achieving a good control of the motor and the speed $\omega$ can be calculated from the angle $\theta$ as a (time) derivative function.

Additional information concerning techniques for controlling electric motors can be gathered for example from the following references (all incorporated herein by reference):
- Vue Zhao, et al: "Sensorless Control of Surface-Mounted Permanent-Magnet Synchronous Machines for Low-Speed Operation Based on High-Frequency Square-Wave Voltage Injection", Industry Applications Society Annual Meeting, 2013-IACC-321, Lake Buena Vista, Fla. 6-11 Oct. 2013, pp. 1 to 8;
- Yoshitaka Iwaji, et al.: "Position Sensorless Control Method at Zero Speed Region for Permanent Magnet Synchronous Motors Using the Neutral Point Voltage of Stator Windings", 2014 IEEE Energy Conversion Congress and Exposition (ECCE), Pittsburgh, Pa., 14-18 Sep. 2014, pp. 4139-4146;
- Matthew J. Corley, et al.: "Rotor Position and Velocity Estimation for a Salient-Pole Permanent Magnet Synchronous Machine at Standstill and High Speeds", IEEE TRANSACTIONS ON INDUSTRY APPLICATIONS, VOL. 34, NO. 4, July/August 1998, pp. 784-789;
- R. Filka, et al.: "Sensorless Control of IPMSM Seamlessly Covering Entire Speed Range without Rotor Positions Sensor", PCIM, Nürnberg, Germany, May 30-31, 2006, pp. 493-498;
- U.S. Pat. No. 8,502,488 (WO 2009/136381 A2).

High frequency current injection may be used to obtain position below the speed where other algorithms (based for example on Back Electromotive Force—BEMF detection) may not be able to detect rotor position.

The Iwaji document cited above discloses an algorithm for obtaining the position from a neutral point which requires a motor having stator windings in a star connection with a neutral point.

One or more embodiments may permit to extract values for $\theta$ from the response of the motor M.

In one or more embodiments, three "injected" voltage values $V_{ainj}$, $V_{binj}$, $V_{cinj}$ may be superimposed in a module 18 on the three control voltage values $V_a, V_b, V_c$ computed by the driving module 10.

In one or more embodiments, two of the injected voltage values $V_{ainj}$, $V_{binj}$, $V_{cinj}$ may be different from zero in a same control cycle.

In one or more embodiments, these superimposed voltages may have impulsive waveforms such as sinusoidal pulses or square (rectangular) pulses and may thus be defined "pulse injection voltages".

Figure 2:
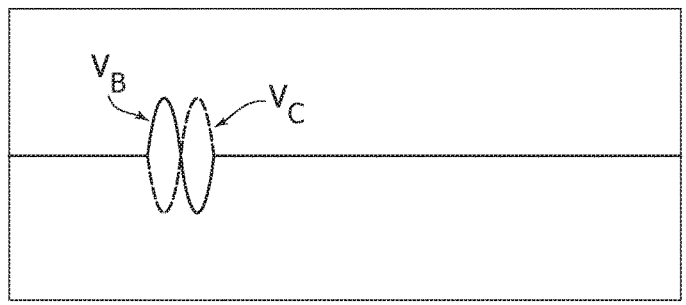
FIG. 2 is a diagram exemplary of injection of sinusoidal voltage pulses in one or more embodiments.

One example is shown in FIG. 2, where $V_B$ indicates a possible waveform for, for example, $V_{binj}$, that is, for example, a single sinusoidal pulse with fixed amplitude and frequency.

In one or more embodiments as exemplified in FIG. 2, $V_c$ indicates a possible waveform for, for example, $V_{cinj}$, that is, for example, again a single sinusoidal pulse with fixed amplitude and frequency which out of phase of a delay 180° with respect to $V_{binj}$.

In one or more embodiments $V_{ainj}=0$ in a corresponding control cycle. Consequently, in one or more embodiments:

$$V_{ainj}=0$$

$$V_{binj}=V_{inj}\sin(\omega_{inj}t)$$

$$V_{cinj}=V_{inj}\sin(\omega_{inj}t+\pi)$$

with $0<t<2\pi/\omega_{inj}$.

In one or more embodiments, injection voltages may thus be injected symmetrically in two phases while motor response is measured in a third phase.

In one or more embodiments the drive voltages $V_a{}^*$, $V_b{}^*$, $V_c{}^*$ that are actually applied to the motor M may be the sum of the control voltages $V_a, V_b, V_c$ from the drive module 10 and the pulse injected voltages $V_{ainj}$, $V_{binj}$, $V_{cinj}$, namely:

$$V_a{}^*=V_a+V_{ainj}$$

$$V_b{}^*=V_b+V_{binj}$$

$$V_c{}^*=V_c+V_{cinj}$$

as provided by the pulse injection module 18 of FIG. 1.

In one or more embodiments, the current sensing module 12 may be configured to convert the real currents of the motor phases (windings A, B, and C) into their digital representations.

In one or more embodiments, the current sensing module 12 may include (in a manner known per se, which makes it unnecessary to provide a more detailed description) shunt resistors or Hall effect sensors, an amplification network and analog-to-digital conversion apparatus.

By way of explanation, one may consider $i_a{}^*$, $i_b{}^*$, $i_c{}^*$ as the digital representation of the motor phase currents as measured by the current sensing block 12.

These may be regarded as real currents that flow in the motor phases (windings A, B, C), each including two components, namely:

fundamental currents $i_{a0}$, $i_{b0}$, $i_{c0}$, that is the currents which provide torque to the motor, these being current components adapted to be used by the driving module 10, response currents $i_{ainj}$, $i_{binj}$, $i_{cinj}$, related primarily to pulse injection, these being current components which may be used to reconstruct the electrical angle θ of the motor M.

The foregoing may be expressed in equation form as:

$$i_a{}^* = i_{a0} + i_{ainj},$$

$$i_b{}^* = i_{b0} + i_{binj},$$

$$i_c{}^* = i_{c0} + i_{cinj}.$$

In one or more embodiments, the pulse decoding module 14 may facilitate separating the components $i_{a0}$, $i_{b0}$, $i_{c0}$ from the components $i_{ainj}$, $i_{binj}$, $i_{cinj}$ and send them to the motor drive module 10 and the angle and speed decoding module 16, respectively.

In one or more embodiments, a simplified implementation of the pulse decoding module 14 may be provided in the case of sinusoidal pulse injection as exemplified in the foregoing, with a voltage pulse injected for example in phases B and C, with the response current considered being $i_{ainj}$, that is the one of the non-energized phase.

Figure 3:
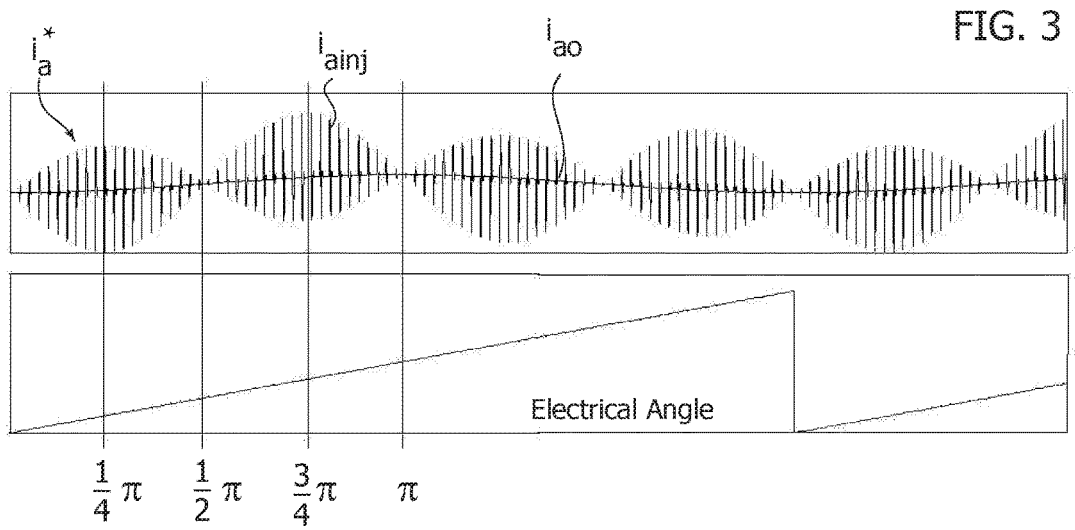
FIG. 3 is a diagram exemplary of motor phase current in embodiments.
Figure 4A:
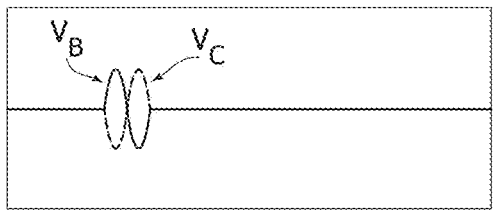
FIGS. 4A-4D and 5A-5D are diagrams exemplary of the variation of sensed response currents with the electric rotor angle.
Figure 4A:
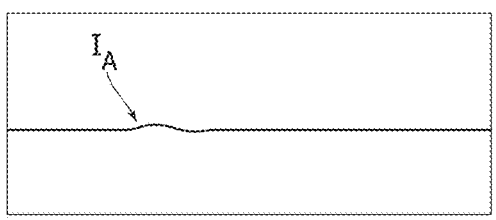
Figure 4B:
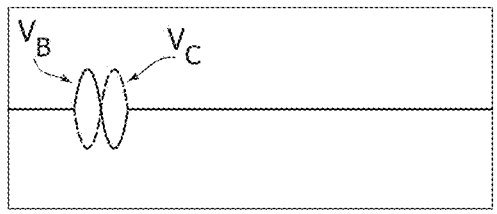
Figure 4B:
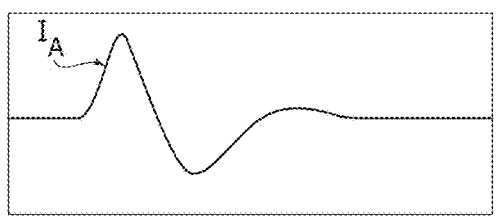
Figure 4C:
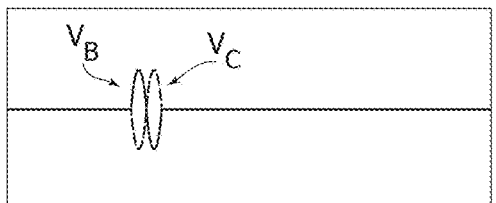
Figure 4C:
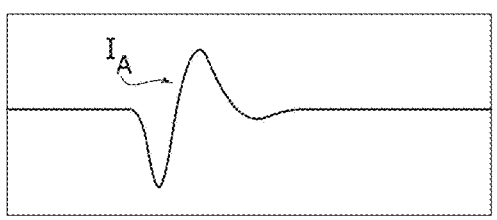
Figure 4D:
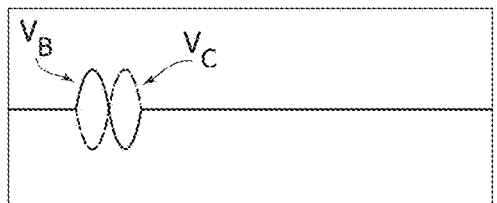
Figure 4D:
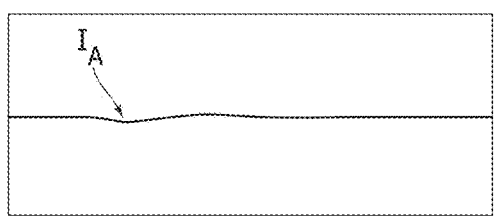
Figure 5A:
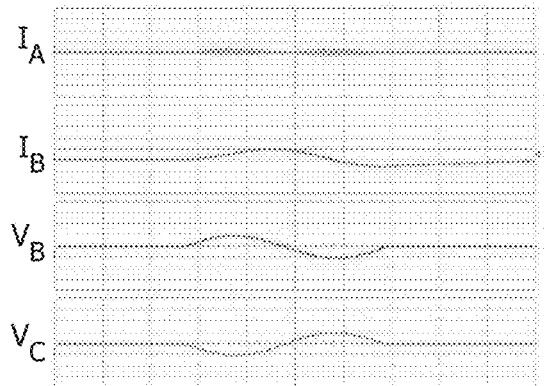
Figure 5B:
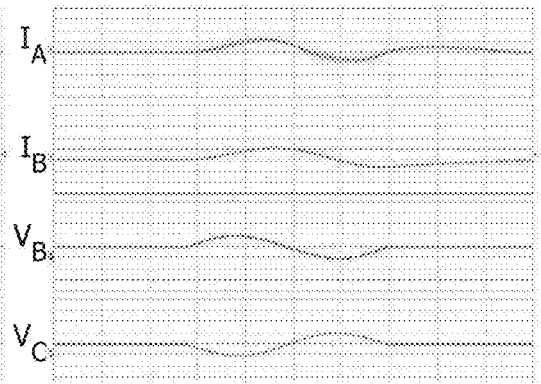
Figure 5C:
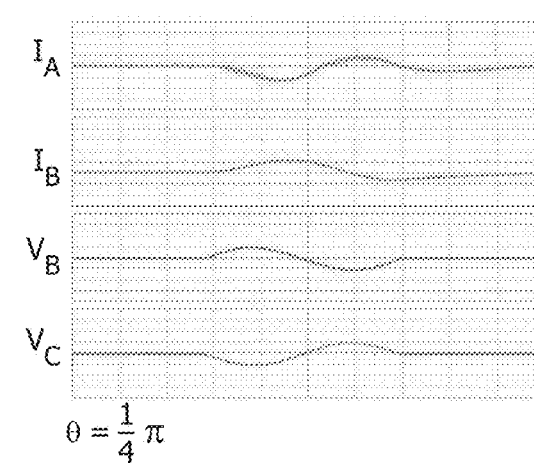
Figure 5D:
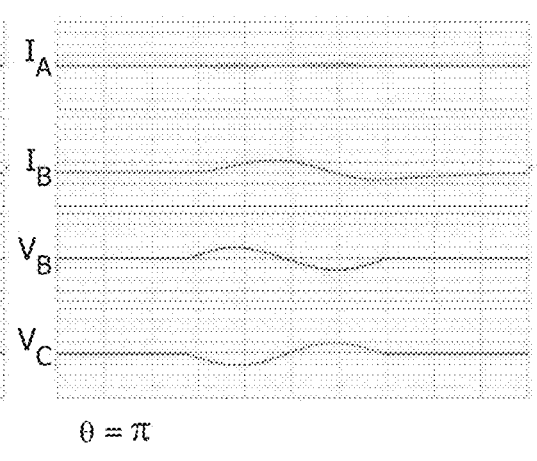

FIG. 3 is an exemplary representation of a possible motor phase current $i_a{}^*$. There, one may observe that a (high frequency) response/injection current $i_{ainj}$ is superimposed to the (low frequency) fundamental/torque current $i_{a0}$.

These two signals have different spectral contents and may be separated by means of a digital filter: for example, a low pass branch for the fundamental and a high pass branch for the response current.

Another simplified way is to consider the value of the current $i_a{}^*$ just before injection, that is basically only current $i_{a0}$ at the moment of the injection, and consider this as an "offset" to be subtracted from the current $i_a{}^*$ for the remaining part of the injection process: the dynamics of the current $i_{a0}$ may in fact be (much) slower than the dynamics of the current $i_{ainj}$.

In one or more embodiments, increasing the sensitivity of this procedure may be facilitated by having the inverted voltage pulse injected.

This may result in having currents such as:

$$i_{ap} = i_{a0} + i_{ainj},$$

$$i_{an} = i_{a0} - i_{ainj},$$

so that the injected current is $$2 i_{ainj} = i_{ap}{}^* - i_{an}{}^*$$

while the fundamental current is:

$$2 i_{a0} = i_{ap}{}^* + i_{an}{}^*$$

Corresponding equations are valid also for the other response currents for example $i_b{}^*$.

As mentioned before, in one or more embodiments the angle and speed decoding module 16 may derive the value for ω as the time derivative of θ.

The following description will thus focus primarily on the estimation of θ starting from the response currents. It was, in fact, observed that information related to the electrical angle θ is present in the response current(s).

FIGS. 4A-4D respectively show by way of example how the response current $i_{ainj}$ (indicated by the arrow $I_A$) may change over time with the electrical angle θ of the rotor in the case of sinusoidal pulse injection as exemplified in FIG. 2.

In FIGS. 5A-5D an exemplary behavior of the response current is represented in the upper line showing how the response current $i_{ainj}$ may change as a function of the electrical angle of the rotor θ in the case of sinusoidal pulse injection as exemplified in FIG. 2.

FIGS. 5A-5D refer by way of example to one or more embodiments where the block 16 may estimate the electrical angle θ by relying on two subsequent injections.

In a first injection, the current $i_{ainj}$ is measured, for example, as a mean value or a peak value. In one or more embodiments the possibility also exists of extracting a derivative component or other parameters from the response signal, for example, to obtain an improved ratio of the valid signal to the noise.

In a second injection, the current $i_{binj}$ is measured, for example after the "pulse decoding":

$$V_{ainj} = V_{inj} \sin(\omega_{inj} t)$$

$$V_{binj} = 0$$

$$V_{cinj} = V_{inj} \sin(\omega_{inj} t + \pi)$$

with $0 < t < 2\pi / \omega_{inj}$.

In one or more embodiments, injection voltages may thus be injected symmetrically in two phases while motor response is measured in a third phase.

In one or more embodiments the angle θ may be reconstructed, for example, as:

$$i_\alpha = i_{binj} + i_{ainj}$$

$$i_\beta = (i_{ainj} - i_{binj}) \cdot \sqrt{3}$$

$$\theta = \operatorname{arctg}(i_\beta / i_\alpha)$$

In one or more embodiments, a tracking observer locked to the current components may be used as an alternative to direct conversion to angle via the arctangent function as in the examplary case.

An injected high frequency voltage pulse may evoke a current phase shift which may depend on the motor impedance which may be represented as:

$$i = u / (R + j\omega L)$$

In one or more embodiments, when injecting just one voltage period, such a phase shift may cause a transient state which makes the current asymmetrical.

Compensation for this effect may be facilitated by starting the (sinusoidal) injection voltage at an angle $\upsilon = \operatorname{arctg}(L/R)$.

Figure 6:
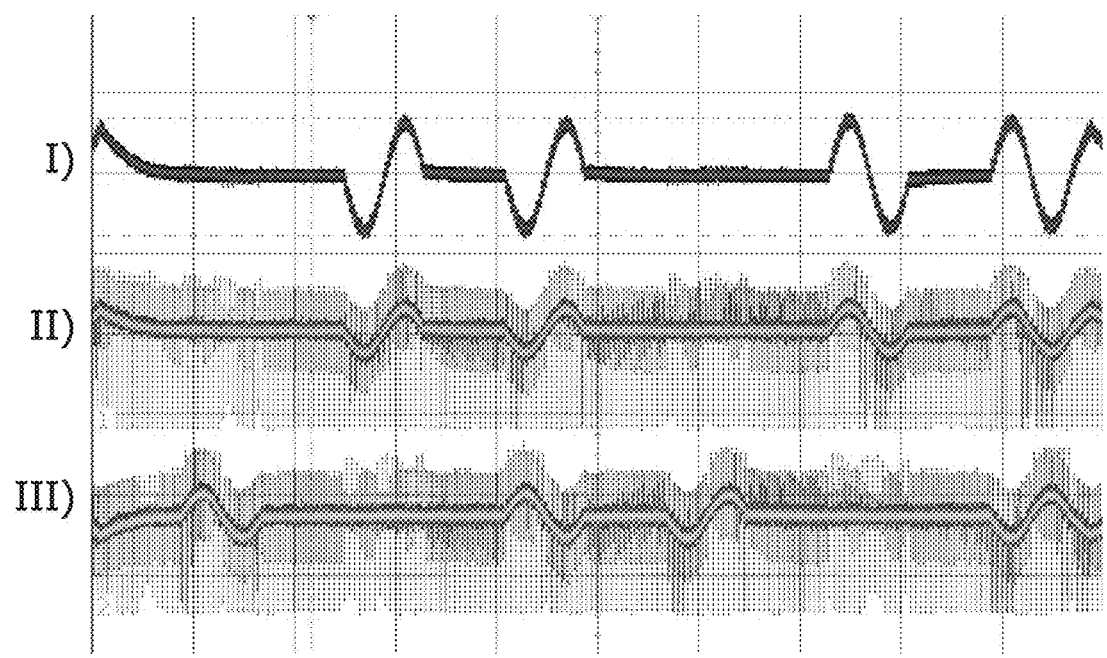
FIG. 6 is a diagram exemplary of currents caused by injection of high frequency voltages.

FIG. 6 is exemplary of possible effects which may result from injection of high frequency voltages.

In FIG. 6, the reference I) is exemplary of the current phase A of the motor M, as sensed by a current probe, the reference II) is exemplary of the current phase A of the motor M as provided at the output of the drive amplifier, and the reference III) is exemplary of the current phase B of the motor M as provided at the output of the drive amplifier.

As exemplified in FIG. 6, the currents caused by injection of high frequency voltages may contain a transient part caused by accuracy of motor parameters and initial values.

Therefore, a same measurement may be performed with opposite voltage polarity for compensation, for example, with a time to exit the transient state inserted between each measuring step.

For instance, in one or more embodiments this may lead to a sequence of eight measuring phases, as exemplified in Table 1 which follows.

TABLE 1

(measuring sequence - sinusoidal injection)

| Index | Current flows | Measuring in phase A | Measuring in phase B |
|---|---|---|---|
| 0 | Phase B to C | Response Current | Injected Current |
| 1 | Demagnetization | Offset | Offset |
| 2 | Phase A to C | Injected Current | Response Current |
| 3 | Demagnetization | Offset | Offset |
| 4 | Phase C to B | Response Current | Injected Current |
| 5 | Demagnetization | Offset | Offset |
| 6 | Phase C to A | Injected Current | Response Current |
| 7 | Demagnetization | Offset | Offset |

In one or more embodiments, the fundamental current may be then sum of measurements over the injected period.

In one or more embodiments, measuring may be performed for any voltage vector:

$$I_a = \Sigma^n_{k=0} i^*_{kP} + \Sigma^n_{k=0} i^*_{kN}.$$

In one or more embodiments, the response to the injected current may be obtained by subtraction between periods with opposite injected voltage polarity, for example, the period with voltage vector phase B to C and the period with voltage vector phase C to B.

Additionally, in one or more embodiments, the range for the sum may be selected in such a way to facilitate the highest response signal:

$$I_{ainj} = \Sigma^y_{k=x} i^*_{kP} - \Sigma^n_{k=x} i^*_{kN}.$$

In one or more embodiments, the period may be separated to positive and negative response parts:

$$I_{ainj} = \Sigma^y_{k=x} i^*_{kP} - \Sigma^n_{k=x} i^*_{kN} - \Sigma^m_{k=n} i^*_{kP} + \Sigma^m_{k=n} i^*_{kN}$$

The preceding description refers to sinusoidal voltage pulse injection.

In one or more embodiments a square (for example rectangular) voltage pulse injection may be used in the place of sinusoidal voltage pulse injection.

Compared to sinusoidal wave injection, square voltage pulse injection may be generated in a few or even in one period of PWM motor drive, while sinusoidal injection may involve one complete period of injected voltage that can be reconstructed in several PWM periods.

In square voltage pulse injection, the motor position may be updated at a higher frequency, with an improved signal-to-noise ratio in practical implementations while a minimal pulse width may be given by motor parameters.

The basic principles underlying injecting square (that is rectangular) voltage pulses are the same as for sinusoidal voltage pulse injection, for example by injecting symmetrical voltage pulses to avoid affecting fundamental currents.

Again, opposite polarity may be applied to simplify separation of fundamental current and response current.

For instance, this may be covered by an examplary pattern of 2×8 pulses, while each pulse contain 5 PWM periods. In such a case the update may be every 80 PWM periods (5*16).

Figure 7:
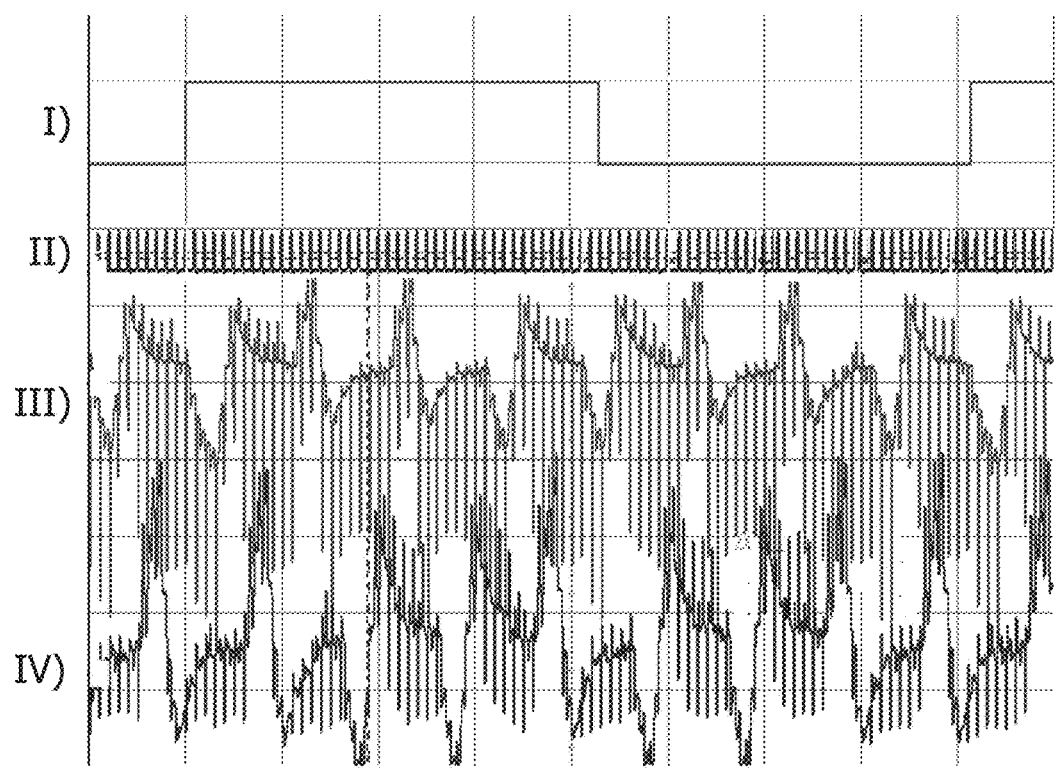
FIG. 7 is a diagram exemplary of motor current for injected square pulses.

In FIG. 7, the reference I) is exemplary of an injected sequence, the reference II) is exemplary of the PWM period, and the references III) and IV) are exemplary of the current phases A and B, respectively of the motor M as provided at the output of the drive amplifier.

An exemplary sequence is shown in Table 2 which follows. Such an exemplary sequence may be selected in a way to keep current symmetry and combine all possibilities of current and previous pulse polarity (see for example the measuring columns).

TABLE 2

(measuring sequence - square wave pulse injection)

| Index | Current flows | Actual Voltage | Last Voltage | Measuring in phase A | Measuring in phase B |
|---|---|---|---|---|---|
| 0 | Phase A to C | A+ | B− | Injected Current | Response Current B+− |
| 1 | Phase C to B | B− | A+ | Not used | Not used |
| 2 | Phase C to A | A− | B− | Injected Current | Response Current B−− |
| 3 | Phase A to C | B+ | A− | A+− (optional) | Injected Current |
| 4 | Phase C to A | A− | B+ | Injected Current | Response Current B−+ |
| 5 | Phase B to C | B+ | A− | A+− (optional) | Injected Current |
| 6 | Phase A to C | A+ | B+ | Injected Current | Response Current B++ |
| 7 | Phase C to B | B− | A+ | Response Current A−+ | Injected Current |
| 8 | Phase A to C | A+ | B− | Not used | Not used |
| 9 | Phase B to C | B+ | A+ | Response Current A++ | Injected Current |
| 10 | Phase C to A | A− | B+ | Not used | Not used |
| 11 | Phase B to C | B+ | A− | Response Current A+− | Injected current |
| 12 | Phase C to A | A− | B+ | Not used | Not used |
| 13 | Phase C to B | B− | A− | Response Current A−− | Injected Current |
| 14 | Phase A to C | A+ | B− | Not used | Not used |
| 15 | Phase C to B | B− | A+ | Not used | Not used |

Again, the fundamental current may be obtained as the sum of measurements over injected period, with measurement performed for any voltage vector:

$$I_a = \Sigma^n_{k=0} i^*_{kP} + \Sigma^n_{k=0} i^*_{kN}.$$

In one or more embodiments, the response to the injected current may be obtained via subtraction of periods with opposite injected voltage polarity.

In this case, the injection sequence may be more complex in order to facilitate compensation of previous pulse polarity. For instance, with reference to Table 2 above, periods 9 and 11 may be taken as positive and periods 7 and 13 as negative for measuring in phase A.

Additionally, in one or more embodiments, the range for the sum may be selected in such a way to facilitate the highest response signal:

$$I_{ainj} = \Sigma^y_{k=x} i^*_{kP} - \Sigma^n_{k=x} i^*_{kN}.$$

In one or more embodiments, the period may be separated to positive and negative response parts:

$$I_{ainj} = \Sigma^y_{k=x} i^*_{kP} - \Sigma^n_{k=x} i^*_{kN} - \Sigma^m_{k=n} i^*_{kP} + \Sigma^m_{k=n} i^*_{kN}$$

One or more embodiments may thus provide a method of driving an electric motor including a plurality of windings, the method including:

sensing (for example, at current sensor 12) currents (for example, $i_a^*$, $i_b^*$, $i_c^*$) in the motor windings, generating (for example, at pulse decoder 14 and angle and speed decoder 16) a motor rotation angle signal (for example, an electrical angle of the rotor such as θ) from the currents sensed, generating (for example, at PMSM driver 10) motor control voltages (for example, $V_a$, $V_b$, $V_c$) as a function of said motor rotation angle signal, driving (for example, at pulse injection circuit 18) the motor windings with motor drive voltages (for example, $V_a^*, V_b^*, V_c^*$) obtained by injecting into said motor control voltages injection pulses (for example, $V_{ainj}, V_{binj}, V_{cinj}$), wherein said currents sensed include torque components (for example, fundamental components $i_{a0}, i_{b0}, i_{c0}$) and injection components (for example, response components $i_{ainj}, i_{binj}, i_{cinj}$), and generating said motor rotation angle signal as a function of said injection components of the currents sensed (for example, as separated from the fundamental currents).

One or more embodiments may include injecting into said motor control voltages pairs of injection pulses, each pair including injection pulses (for example, $V_B, V_C$ in FIG. 2) of opposed polarities.

One or more embodiments may include sensing said currents by subtraction between periods with opposed injected voltage polarity (for example, $I_{ainj} = \Sigma^{y}_{k=x} i^*_{kP} - \Sigma^{n}_{k=x} i^*_{kN}$).

In one or more embodiments, wherein the driven motor (for example, M) includes three windings (for example, A, B, C) energized in three respective phases, the method may include injecting injection pulses in two of said three phases while refraining from injecting injection pulses in the third of said three phases, for example:

$V_{ainj} = 0$ $V_{binj} = +V_{inj}$ $V_{cinj} = -V_{inj}$

In one or more embodiments, wherein the driven motor (for example M) has an impedance having resistive and inductive components R and L, respectively, the method may include starting injecting said injection pulses at an angle $\upsilon = \text{arctg}(L/R)$.

In one or more embodiments, said injection pulses may include sinusoidal injection pulses.

In one or more embodiments, said injection pulses may include square wave injection pulses.

One or more embodiments may include:

generating from said motor rotation angle signal, preferably as a (time) derivative, a motor rotation speed signal (for example $\omega$), generating said motor control voltages (for example, $V_a, V_b, V_c$) as a function of both said motor rotation angle signal and said motor rotation speed signal.

One or more embodiments may provide a drive device for electric motors including a plurality of windings, the device including a sensing module for sensing currents in the motor windings and a driving system configured for:

generating a motor rotation angle signal (for example, the electrical angle of the rotor) from the currents sensed, generating motor control voltages as a function of said motor rotation angle signal, driving the motor windings with motor drive voltages obtained by injecting into said motor control voltages injection pulses, wherein said currents sensed include torque components and injection components, and generating said motor rotation angle signal as a function of said injection components of the currents sensed, wherein the device is configured for operating according to the method described by one or more embodiments herein.

In one or more embodiments, an electric motor including a plurality of windings may have coupled therewith a drive device as exemplified herein.

Without prejudice to the underlying principles, the details and embodiments may vary, even significantly, with respect to what has been disclosed merely by way of example, without departing from the extent of protection.

The extent of protection is defined by the annexed claims.

The invention claimed is:

1. A method of driving an electric motor including a plurality of windings, the method including:
   sensing currents in the motor windings,
   generating a motor rotation angle signal from the sensed currents,
   generating motor control voltages as a function of said motor rotation angle signal,
   simultaneously superimposing a pair of injection pulses on a corresponding pair of said motor control voltages to generate first and second motor drive voltages, without simultaneously superimposing an injection pulse on any other motor control voltage to generate a third motor drive voltage, wherein the pair of injection pulses comprises a first pulse and a second pulse and the first and second pulses have a 180 degree phase difference with respect to each other, and
   applying the generated first, second and third motor drive voltages directly to corresponding windings of said plurality of windings of said electric motor,
   wherein said sensed currents include torque components and injection components, and
   wherein generating said motor rotation angle signal comprises generating the motor rotation angle signal as a function of said injection components of the sensed currents.

2. The method of claim 1, wherein sensing currents comprises sensing said currents by subtraction between periods with opposed injected voltage polarity.

3. The method of claim 1, wherein the motor includes three windings energized in three phases, respectively, the method including simultaneously superimposing said pair of injection pulses in two of said three phases without simultaneously superimposing any injection pulse in the third of said three phases, and wherein the sensed current is in the winding for the third of said three phases.

4. The method of claim 1, wherein the motor has an impedance having resistive and inductive components R and L, respectively, the method including starting simultaneously superimposing said pair of injection pulses at an angle $\upsilon = \text{arctg}(L/R)$.

5. The method of claim 1, wherein said pair of injection pulses include sinusoidal injection pulses.

6. The method of claim 1, wherein said pair of injection pulses include square wave injection pulses.

7. The method of claim 1, including:
   generating from said motor rotation angle signal a motor rotation speed signal, and
   generating said motor control voltages as a function of both said motor rotation angle signal and said motor rotation speed signal.

8. A device for driving an electric motor including a plurality of windings, the device including:
   a sensing module configured to sense currents in the motor windings, and
   a driving system configured to:
     generate a motor rotation angle signal from the sensed currents,
     generate motor control voltages as a function of said motor rotation angle signal,
     simultaneously superimpose a pair of injection pulses on a corresponding pair of said motor control voltages to generate first and second motor drive voltages, without simultaneously superimposing an injection pulse on any other motor control voltage to generate a third motor drive voltage, wherein the pair of injection pulses comprises a first pulse and a second pulse and the first and second pulses have a 180 degree phase difference with respect to each other, apply the generated first, second and third motor drive voltages directly to corresponding windings of said plurality of windings of said electric motor, wherein said sensed currents include torque components and injection components, and generate said motor rotation angle signal as a function of said injection components of the sensed currents.

9. The device of claim 8, wherein the sensing module is configured to sense currents by subtraction between periods with opposed injected voltage polarity.

10. The device of claim 8, wherein the motor includes three windings energized in three phases, respectively, said driving system configured to simultaneously superimpose said pair of injection pulses in two of said three phases without simultaneously superimposing any injection pulse in the third of said three phases, and wherein the sensed current is in the winding for the third of said three phases.

11. The device of claim 8, wherein the motor has an impedance having resistive and inductive components R and L, respectively, said driving system configured to start simultaneously superimposing said pair of injection pulses at an angle $\upsilon=\mathrm{arctg}(L/R)$.

12. The device of claim 8, wherein said pair of injection pulses include sinusoidal injection pulses.

13. The device of claim 8, wherein said par of injection pulses include square wave injection pulses.

14. The device of claim 8, where said driving system is further configured to:
generate from said motor rotation angle signal a motor rotation speed signal, and
generate said motor control voltages as a function of both said motor rotation angle signal and said motor rotation speed signal.

15. A method of driving an electric motor including a first winding, a second winding and a third winding, the method including:
sensing currents in the first, second and third windings,
generating a motor rotation angle signal from the sensed currents,
generating first, second and third motor control voltages as a function of said motor rotation angle signal,
simultaneously performing:
injecting into the first motor control voltage a first injection pulse to generate a first motor drive voltage that is directly applied to the first winding,
injecting into the second motor control voltage a second injection pulse to generate a second motor drive voltage that is directly applied to the second winding, and
not injecting any injection pulse into the third motor control voltage to generate a third motor drive voltage that is directly applied to the third winding, wherein the first and second injection pulses have a 180 degree phase difference with respect to each other, and wherein generating said motor rotation angle signal comprises generating the motor rotation angle signal as a function of injection components within the sensed currents that result from the first and second injection pulses.

16. The method of claim 15, wherein the motor has an impedance having resistive and inductive components R and L, respectively, the method including starting injecting the first and second injection pulses at an angle $\upsilon=\mathrm{arctg}(L/R)$.

17. The method of claim 15, wherein said first and second injection pulses are sinusoidal pulses.

18. The method of claim 15, wherein said first and second injection pulses are square wave pulses.

19. The method of claim 15, including:
generating a motor rotation speed signal from said motor rotation angle signal, and
generating said motor control voltages as a function of both said motor rotation angle signal and said motor rotation speed signal.

20. A method of driving an electric motor including first, second and third windings, the method including:
generating first, second and third motor control voltages;
simultaneously superimposing a first injection pulse and a second injection pulse on the first and second motor control voltages, without simultaneously superimposing an injection pulse on the third motor control voltage, to generate corresponding first, second and third motor drive voltages for application to the first, second and third windings, respectively, of the electric motor;
wherein the first injection pulse and the second injection pulse have a 180 degree phase difference with respect to each other;
sensing a current in the third winding of the electric motor;
generating a motor rotation angle signal from the sensed current in the third winding;
wherein the first, second and third motor control voltages are generated as a function of said motor rotation angle signal.

21. The method of claim 20, wherein the sensed current includes a torque component and an injection component, and wherein generating said motor rotation angle signal comprises generating the motor rotation angle signal as a function of said injection component of the sensed current.

22. The method of claim 20, wherein sensing current comprises sensing current by subtraction between periods with opposed injected voltage polarity.

23. The method of claim 20, wherein each of the first and second injection pulses has a sinusoidal waveform.

24. The method of claim 20, wherein each of the first and second injection pulses has a square waveform.

25. The method of claim 20, further including:
generating from said motor rotation angle signal a motor rotation speed signal, and
generating said first, second and third motor control voltages as a function of both said motor rotation angle signal and said motor rotation speed signal.

* * * * *